US006952681B2

(12) United States Patent
McQuade et al.

(10) Patent No.: US 6,952,681 B2
(45) Date of Patent: Oct. 4, 2005

(54) TRACKING THE DISTRIBUTION OF PRESCRIPTION DRUGS AND OTHER CONTROLLED ARTICLES

(75) Inventors: Richard McQuade, Flemington, NJ (US); Marc Chester, Brick, NJ (US); Michael J. DePalma, Oak Ridge, NJ (US)

(73) Assignee: Data Reduction Systems Corp., Union, NJ (US)

( * ) Notice: Subject to any disclaimer, the term of this patent is extended or adjusted under 35 U.S.C. 154(b) by 236 days.

(21) Appl. No.: 09/942,803

(22) Filed: Aug. 30, 2001

(65) Prior Publication Data

US 2002/0042762 A1 Apr. 11, 2002

Related U.S. Application Data

(60) Provisional application No. 60/230,764, filed on Sep. 7, 2000.

(51) Int. Cl.[7] .............................................. G06F 17/60
(52) U.S. Cl. ......................................... 705/28; 705/22
(58) Field of Search ............................. 705/28, 22, 2, 705/3

(56) References Cited

U.S. PATENT DOCUMENTS

| | | | | | |
|---|---|---|---|---|---|
| 5,712,989 | A | * | 1/1998 | Johnson et al. | ............... 705/28 |
| 5,832,449 | A | * | 11/1998 | Cunningham | .................. 705/3 |
| 6,055,507 | A | * | 4/2000 | Cunningham | .................. 705/3 |
| 6,859,780 | B1 | * | 2/2005 | Cunningham | .................. 705/3 |
| 2001/0044731 | A1 | * | 11/2001 | Coffman et al. | ............... 705/3 |
| 2001/0056359 | A1 | * | 12/2001 | Abreu | ........................... 705/3 |
| 2002/0022991 | A1 | * | 2/2002 | Sharood et al. | ............... 705/14 |
| 2002/0032501 | A1 | * | 3/2002 | Tilles et al. | ................. 700/214 |
| 2003/0088442 | A1 | * | 5/2003 | Michael et al. | ................ 705/3 |
| 2003/0160698 | A1 | * | 8/2003 | Andreasson et al. | ..... 340/573.1 |
| 2004/0205343 | A1 | * | 10/2004 | Forth et al. | ................. 713/168 |
| 2004/0225528 | A1 | * | 11/2004 | Brock | ........................... 705/2 |

FOREIGN PATENT DOCUMENTS

CA     2 359 502     *  4/2002

OTHER PUBLICATIONS

BusinessWire, IMS Health Strategic Technologies Launches SampleTrak, the First Web–Based Solution for Managing prescription Drug Sampling, Apr. 19, 200, p. 1.*
Merriam Webster's Collegiate Dictionary, Tenth Edition, 1996, p. 936.*
21 CRF Parts 203 and 205 RIN 0910–AA08, Prescription Drug Marketing Act of 1987; Prescription Drug Amendments of 1992; Policies, Requirements, and Administrative Procedures, Final Rule, 64 FR 677220, Dec. 3, 1999.*
21 CFR Part 11 RIN 0910–AA29 Electronic Records; Electronic Signatures Part II, Final Rule, 62 CFR 13430, Mar. 20, 1997.*
IMS Health Strategic Technologies, Handheld Solutions Overview, http://web.archive.org/web/20000510171451/www.st.imshealth.com/solutions.st_sol)handheld.htm, archived May 10, 2000, printed Nov. 13, 2003.*
Gayle Ehrenman, Enterprise Handheld Applications—Cut Your Data Down to Size—The Unrelenting Need for Fresh Data—Fast—is driving the increased use of handhelds, InternetWeek, Iss. 811, May 1, 2000, p. 49.*

* cited by examiner

*Primary Examiner*—Lynda Jasmin
*Assistant Examiner*—Ronald Laneau
(74) *Attorney, Agent, or Firm*—McCarter & English, LLP (57) ABSTRACT

The disclosed system (System) was created to address many issues related the difficulty of maintaining control of pharmaceutical samples. By leveraging state of art technologies the System revolutionizes the way pharmaceutical companies disburse and track all samples to both the pharmaceutical sales representative and the licensed practitioner. With the advent of handheld computing and wireless technologies, the system process also leverages inventory management and bar code scanning, thus creating an overall process that addresses many needs.

18 Claims, 5 Drawing Sheets

TRACKING THE DISTRIBUTION OF PRESCRIPTION DRUGS AND OTHER CONTROLLED ARTICLES

RELATED APPLICATIONS

This application claims priority from Provisional Application U.S. Application No. 60/230,764, filed Sep. 7, 2000.

GOVERNMENT FUNDED RESEARCH

Not Applicable

BACKGROUND OF THE INVENTION

1. Field of the Invention

The invention is in the field of sample distribution and inventory control.

2. Description of the Background Art

The Prescription Drug Marketing Act of 1987 (PDMA) passed by the US Congress attempts to regulate and track the disbursement of sample pharmaceutical drugs and controlled substances to licensed practitioners nationwide. Prior to PDMA, there was no specific legislation regulating the flow of product samples to practitioners. As a result, significant diversion of substances, including prescription drugs and controlled drugs by practitioners and pharmaceutical sales representatives as well other parties was not only possible, but also prevalent. Pharmaceutical sales representatives meet with and distribute free samples of pharmaceutical products to practitioners. The Pharmaceutical Industry builds sales of its products indirectly, through the prescription of specific drugs by practitioners, to the general public.

The PDMA of 1987 did much to address the issues contributing to drug diversion, mandating specific tracking mechanisms and data elements required to be monitored in an effort to detect and prevent drug diversion. These measures included paper documents (Sample Disbursement Forms—SDFs), which are to be filled out by pharmaceutical representatives and signed by licensed practitioners. These forms capture information about the date of the sampling activity, the product disbursed, quantities, practitioner information such as name, address, DEA#, etc. In this manner, a comprehensive record of the transaction would be available for audit by both pharmaceutical companies as well as outside regulatory agencies such as the Drug Enforcement Agency (DEA) and Food and Drug Administration (FDA).

While certainly better than no system at all, these paper-based systems still have significant drawbacks such as:

1.) rely on the representative to send in forms in a timely manner for processing. As a matter of routine, representatives often wait weeks to send in forms, contributing to a significant time lag between the time of transaction and ultimate receipt of completed data by a pharmaceutical client;
2.) errors related to incorrect completion of forms and data capture of form information;
3.) difficult or sometimes impossible to reconcile sample inventories due to time delay in processing of data from multiple disparate sources, using time-intensive processes; and
4.) significant processing time.

This process is generally referred to as a "rep-centric" process. i.e. one in which a pharmaceutical sales representative determines all actions related to the disbursement of product samples and recording of this activity, including accuracy and timeliness of the submission.

The computing revolution of the 1980's did have an effect however. By the early/mid 1990's a number of companies developed electronic versions of these paper-based sample-tracking systems. Then, as now, most or all of these systems promise tremendous improvement over paper-based processing. Unfortunately, however, significant drawbacks remain, such as:

1.) systems are still completely rep-centric, that is, they give complete authority to the sales representative to create/edit records and information about sampling transactions.
2.) electronic systems (at the time) could not offer electronic signatures that were legally binding (as is an original signature on a sample disbursement form). For this reason, most electronic Sales Force Automation systems (SFA's) work in concert with, rather than instead of, existing paper-based systems. This is generally referred to as a hybrid or dual system.
3.) electronic hybrid systems rely on a representative to act as data-entry clerks by replicating the paper-based data in the electronic environment, resulting in not only inaccurate data, but also a reduction in valuable selling time by the sales force.
4.) ultimately, electronic systems still relied on the representative to synchronize his/her transaction data in a timely manner. Even if a diligent representative synchronized weekly, there still exists a significant time lag in receipt of this sensitive data.
5.) hybrid systems, by definition, create additional disparate data streams. Although these streams are meant to be identical, they often are not, resulting in the need to reconcile the data streams.
6.) the electronic/hybrid systems report data from the disbursement after the transaction has occurred. There is no reasonable way to enforce the timely submission (synchronization) of this information in these systems.

Presently, no system, paper or electronic exists which addresses these and other driving needs of PDMA compliance, as well as additional data requirements of pharmaceutical companies.

In an effort to address these needs, the hereindisclosed system is a completely new approach to sample accountability. By leveraging existing widespread technologies and re-engineering the sample accountability process flow, this system promises to completely recreate the sample disbursement process, as it presently exists.

SUMMARY OF THE INVENTION

On Dec. 4, 2000, new regulations went into effect that directly impact all pharmaceutical companies in many ways. These regulations are covered in the following document "DEPARTMENT OF HEALTH AND HUMAN SERVICES Food and Drug Administration 21 CFR Parts 203 and 205 RIN 0910-AA08 prescription Drug Marketing Act of 1987; Prescription Drug Amendments of 1992; Policies, Requirements, and Administrative Procedures AGENCY: Food and Drug Administration, HHS. ACTION: Final rule The hereindisclosed inventive system (System) was created to address many issues related to this ruling. By leveraging state of art technologies the System revolutionizes the way pharmaceutical companies disburse and track all samples to both the pharmaceutical sales representative and the licensed practitioner. With the advent of handheld computing and wireless technologies, the system process also leverages inventory management and bar code scanning, thus creating an overall process that addresses many needs.

By utilizing a portable device incorporating an operating system such as Palm OS or Windows CE device (e.g., Palm VII, HP Pocket PC or Symbol Technologies SPT1500) a pharmaceutical sales representative can conduct product detailing electronically in "Real Time" using the System. Such devices are referred to as Personal Digital Assistants (PDAs). (Palm® and Palm OS® are registered trademarks of Palm Computing, Inc. or 3Com, Inc. and their subsidiaries. Windows CE® is a registered trademark of Microsoft Corporation.) The process begins with the representative entering his/her unique identifier. Next the representative will enter the practitioner's unique identifier. After entering the practitioner information the representative records sample detail information. This can be accomplished utilizing a bar code scanner incorporated on the hand held device. In an optimum situation each product has a bar code label affixed that corresponds to detailed product information (i.e. lot#, expiration etc.). After completing this information the representative presents a summary of the order on his/her hand held device for review by the practitioner. Upon review and acceptance the practitioner "digitally" signs the product request on the PDA. A date/time stamp is recorded when the practitioner signs the record. To complete the order the representative countersigns the sample request. This will again create a date/time stamp on this order.

The order is now complete on the hand held device. This completed order is now transmitted via a wireless technology to the System's central processor. The central processor receives this order/transaction and process it using specific business logic to evaluate and authorize this transaction—in "real time". The specific business logic is specified by each pharmaceutical company to satisfy its own business needs. No samples can be left with the practitioner without authorization from central processor. Upon authorization, central processor will update a representative "Virtual Inventory" of samples. These processes, real time authorization and real time virtual inventory updating, are both new concepts for this industry. By authorizing all samples left with a practitioner, no activity by a representative can be conducted without the authority of the central processor. This changes the current process; receiving disbursement data anywhere from hours to days and sometimes weeks after a call has been completed. Pharmaceutical companies now have up-to date disbursement information as it is being transacted.

If a call cannot be conducted via the hand held device (i.e. practitioner will not sign a device, hard ware software failure, lack of connectivity etc.) the System's process would allow the representative to complete the transaction in "Real Time" by utilizing The system's Fax Back (FB) facility. A representative then uses a Sample Disbursement Form (SDF) with a unique document ID to conduct the transaction. The form is filled out with all the necessary information as outlined above and signed by the physician. The representative then uses a facsimile to send the paper form to the FB service (via an 800 number Fax Server) for processing and authorization. Upon receipt, the information from the form is data entered and processed according to the business logic outline above. If approved an authorization code is generated and attached to the form and then "Faxed Back" to the practitioner's office. This form serves two purposes, one is to serve as a receipt of the transaction, and the second is to acknowledge to the representative this is a valid transaction.

In the event the representative cannot use either the hand held device or the FB service, a third option the System Interactive Voice Response (IVR) facility is available for conducting a sample disbursement call. The IVR process begins with the representative using a SDF form with a unique document ID to conduct the transaction, like the FB option form. After completing the form the representative phones central processor. Data from the call is now entered into the central processor service via a phone IVR system. Once the data entry is complete the system reads back to the representative an authorization number that the representative writes on the SDF. Upon receipt of the authorization, the transaction is complete and the representative can now leave the practitioner with the requested samples. As with all of the above processes, the representative's virtual inventory is also updated to reflect this authorized transaction. The representative is now responsible for faxing the paper record in to central processor to complete the process.

The System process is broken down into two phases. The first is data collection in the field, the second is transaction authorization and updating of the control database to reflect the transaction.

DETAILED DESCRIPTION OF THE INVENTION

The System implements a great change in sample accountability processing. By addressing the problems with current systems, as well as the very reason that PDMA exists today (methods of diversion, exacerbated by systems ill-equipped to handle the data flow), the System completely redesigns the sample disbursement process.

The System incorporates following components:

1. Just in Time (JIT) inventory management/warehouse product allocation.
2. Bar code scanning of product sample to ascertain accurate and complete information, as well as providing real-time reconciliation of sample data.
3. Real-Time validation of Practitioner credentials and other data.
4. Authorization for the representative to leave samples with a valid practitioner.

By addressing many issues above and beyond that of simple data collection, the System provides a complete environment in which pharmaceutical companies can accurately maintain representative inventory, insure that samples are left with valid practitioners, and insure compliance with PDMA requirements.

One central tenet of the System is inventory management. In the System's process, sample inventory is transferred to a virtual location. This is not only the representative's physical location, but is also represented by a warehouse sub-location in the System's database. In this manner, the product remains in the warehouse inventory, and is viewed as an available product in a unique virtual location corresponding to a single representative.

Another optional component of the System's process, involves the incorporation of bar codes on product samples. These bar codes represent pseudo-keys from which detailed product information can be ascertained. It is important to note, that by utilizing a pseudo-key instead of actual product information, the barcode number itself holds no specific meaning. This pseudo-key corresponds to a record in a centrally located product database, identifying the product, NDC code, lot#, quantity, expiration date, as well as any other pertinent information. This bar coded product information is linked to the representative's virtual inventory. Representatives can only sample product that has been allocated to them (i.e. exists in their virtual warehouse location). Quantities sampled are deducted from the representative virtual inventory and the central inventory at the time of transaction.

In the System model, after data is collected, it is transmitted to a central source for collection and analysis. Information is verified/validated against known data sources. Examples include verification/validation of practitioner data against DEA and or State License tables, product information against inventory and product tables, and representative information against representative demographic data.

In the System model, a representative transacts in real-time, providing not only real-time data on the transaction time/place, but also providing up to the minute information on the validity of current practitioner information, as well as real-time inventory adjustment. In this manner, each representative provides a number of functions never before possible with such speed and accuracy:

1.) Provides actual date/time information of transaction. This information, along with practitioner information, inventory information, and other required data are then immediately available to other company functions (marketing, etc).

2.) By treating each rep/rep ID as a roaming virtual inventory, pharmaceutical clients and representatives are able to know with certainty exactly what a representative inventory should be. This simple fact is most impressive if one considers that such control was never before possible, prompting PDMA to require physical inventories be performed by an independent source to verify a representative's inventory at least annually. Several pharmaceutical companies have adopted a quarterly approach to audits and inventories in an effort to better deter theft and diversion, as well as to simply improve the validity of sample inventory data.

3.) The onus of providing complete information is no longer on the representative. Rather, by providing specific key data elements, using pseudo keys for sensitive data elements (such as drug information, lot#, etc.) and relying on a central processing service central processor to provide this data, a representative no longer controls the transaction. Rather, the representative becomes a conduit for the information. In short, the System eliminates the rep-centric nature of most current systems. By removing the control from the representative, diversion is much more difficult.

4.) Pharmaceutical companies can gain access to real-time data on sample disbursement using the central processor, allowing better decision-making, and increased profitability.

5.) The system process also minimizes the amount of product that is "lost" annually. Tighter controls from the moment product is shipped from the pharmaceutical manufacturer will allow each company to track, at any given time, their outstanding product inventory. By nature of the System process this now includes not just factory warehouse but the virtual warehouse locations as well.

This in turn should lower operating costs for these companies

Real-Time Inventory Management

Figure 1:
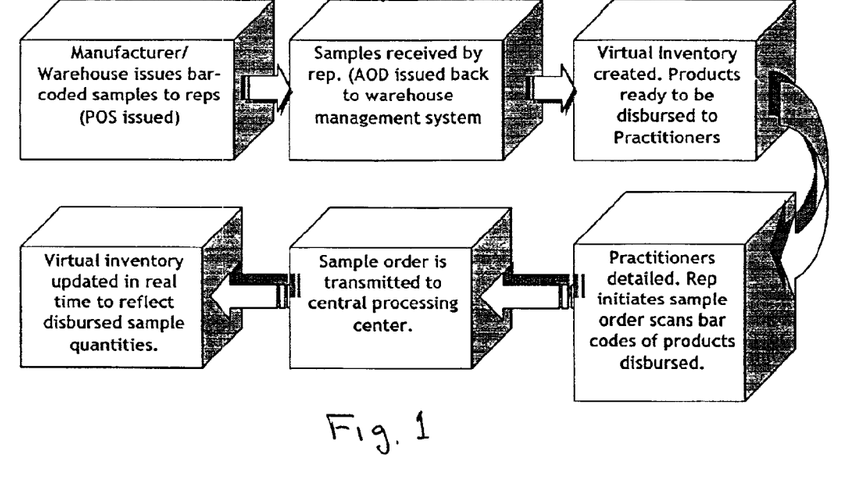
FIG. 1 is a flow chart of the virtual inventory process.

Typically, sample inventory is issued from the manufacturers warehouse and shipped to a "final" destination. In the case of representative sample inventories, once the product is shipped and leaves the warehouse, a proof of shipping (POS) is issued, followed by an acknowledgement of delivery (AOD) from the representative. Under current systems, once the warehouse receives the AOD, that inventory can no longer be accounted for or reconciled until an actual physical inventory takes place. Due to the inherent inaccuracies built into this time lag, inventory quantities cannot be reconciled accurately. Additionally, this time lag may contribute to potential diversion or loss of products. FIG. 1 shows the information flow in the virtual inventory mechanism.

Bar Code

Figure 2:
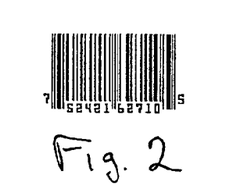
FIG. 2 is an illustration of an exemplary pseudokey bar code.

1. Manufacturer/Warehouse issues bar-coded product and packaging for, preferably, all products to be distributed by representative. The product bar code, as illustrated in FIG. 2, is a pseudo key, referring to a detailed product table in the central inventory system. This pseudo key corresponds to a product record containing detailed information, including, but not limited to:
   a. product Name
   b. product NDC Code
   c. product lot number
   d. product expiration date
   e. product quantity (per package)

2. Once the product is picked and denoted in the warehouse management system as "shipped", it is simultaneously allocated to a new virtual warehouse sub location, corresponding to the representative receiving the product(s). Each representative has a corresponding virtual warehouse location to which all sample products are allocated, and from which all sample disbursements are removed. In this fashion, the warehouse management system maintains a "virtual inventory" of product samples for each representative. This virtual inventory (VI) is maintained in real-time via the transactional nature of the System on the System network. Virtual inventory also allows pharmaceutical companies to ship product to their field sales force based upon thresholds set by the company. The system can monitor inventory levels and upon reaching a pre-designated threshold can alert the pharmaceutical company to ship which products to which representatives.

3. All shipments from the warehouse are considered accurate at the time of shipping. The POS is considered an accurate representation of the products shipped to, and received by the representative at this time. Upon receipt of the actual samples, it is incumbent upon the representative to acknowledge actual receipt of the shipment, as well as verify quantities and lots received. Options include:
   i. The representative may scan product bar codes from the shipment, creating an AOD for each product/lot/qty received. This information will then be synchronized with the central processor service upon completion. An inventory adjustment or additional action will occur at this point. In the event the AOD does not match the POS, additional corrective action must be taken. However, due to the real-time nature of the System, this information is available much sooner than in current systems.

ii. In the absence of bar codes, the representative may physically count the shipment in the presence of the shipper. Discrepancies must be noted at the time of delivery. If the order is correct, the representative will issue an AOD electronically through the System. If the order is incorrect or incomplete, additional corrective action is taken.

iii. Once the inventory has been received and the representative initiates an AOD, the System reconciles the representative's virtual inventory with the products received. This information is now available via either the System or the manufacturer's warehouse management system. Note: Based upon requirements of the pharmaceutical company client this inventory information can be accessed by the representative or an agent of the company through a secure web site.

4. Inventory transfers and other disbursements are also tracked using the System process. Current PDMA regulations stipulate that last inventory data, current inventory data, distributions to rep, all distributions, transfers, returns, and adjustments since the last inventory be captured within a specified tolerance.

Transfers in case/lot quantities discourage diversion, as well as potential theft or loss.

Figure 3:
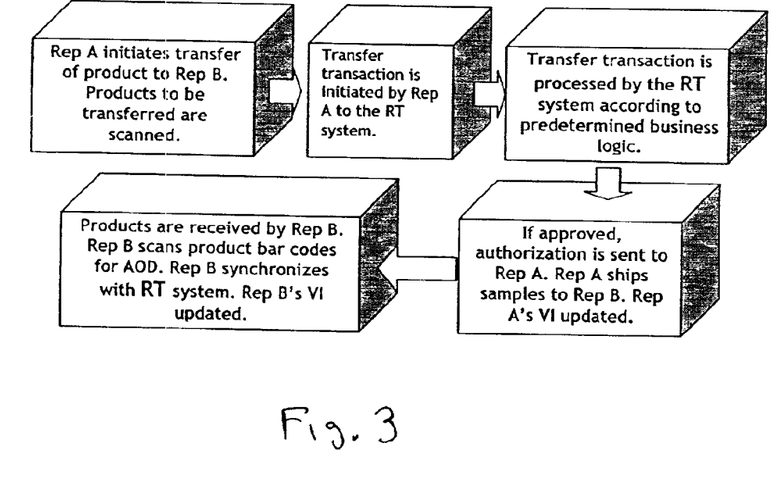
FIG. 3 is a flow chart showing the process of inventory transfers from one representative to another representative.

Transfers between representatives are tracked as illustrated in FIG. 3.

Real-Time Verification and Validation of Data

Under current PDMA regulations, as well as FDA and DEA regulations, pharmaceutical samples must be distributed to only valid licensed practitioners. In current processes, whether paper-based or electronic, data is verified and validated against specific data tables to insure accuracy. However, these processes occur well after the transaction is completed. The System redefines this process by utilizing real-time verification and validation of practitioner, product and representative data, as well as any data required by a specific pharmaceutical company and/or PDMA or other regulations.

Figure 4:
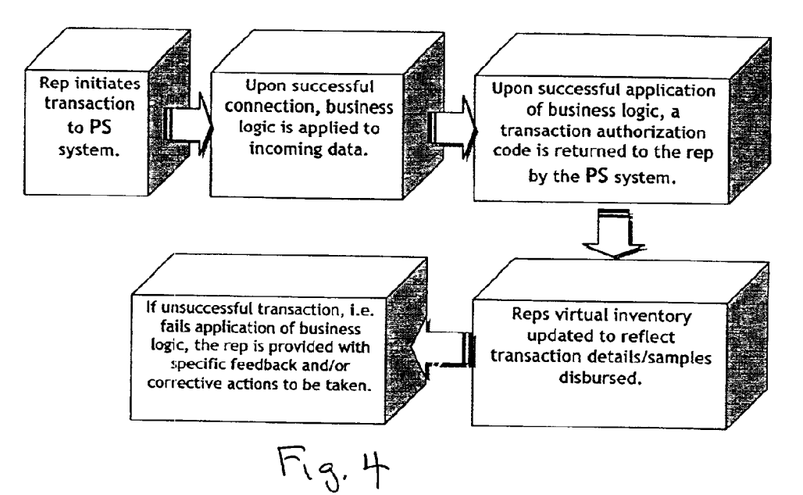
FIG. 4 is a flow chart showing the authorization process.

By presenting disbursement information to the System at the time of each transaction, greater control over the transaction is possible. By providing details of the sample disbursement at the time of the transaction, the System not only verifies that samples are being distributed to a licensed, valid practitioner, but provides back an authorization code to the representative upon successful completion of the application of these and other business rules. This authorization code denotes the successful completion of the disbursement, as well as the successful incorporation of that record into the System transaction history, and includes updates to the representative virtual inventory. The real time authorization process flows is shown in FIG. 4.

Specifically, information provided to the System with each transaction is verified and/or validated against the most accurate data sources available at the time of the transaction. These data sources include, but are not limited to:

DEA Information (for distribution of controlled substances)

State License Information (To determine validity of a practitioner)

Product Information (To insure disbursement of valid products and lot numbers)

Rep Information (To determine validity of representative demographic information)

Specific Business Logic (as defined by specific pharmaceutical clients)

At this point it is important to note that some of this data will be somewhat static. Examples of static data include representative demographics, as well as product offering for a specific pharmaceutical company. Other data, such as valid practitioner information, is quite dynamic in nature.

The distinct advantage that the System offers over other systems is the timeliness of information and the Co-Op (shared) data. A single instance of this benefit is by continually updating the database containing the practitioner universe. With each successful transaction, the System essentially "scrubs" the practitioner data. As the size of the sales force utilizing the System increases, so does the validity of the data. With each add, change, or delete (ACD) to the practitioner database, the System database is updated to reflect the most current information. In contrast, current systems, that track sample disbursement activity after the fact, generally rely on data, that is updated periodically. In the case of DEA data, the data is updated monthly, with an estimated 30% change in data per month. By sharing information pertaining to valid practitioners, pharmaceutical clients can in effect, increase the accuracy of this scrub by leveraging transactional data being provided by the sales forces of other pharmaceutical clients. In other words, if Pharma Company A has 100 representative detailing practitioners, and Pharma Company B has 500 reps, the net effect for each company is that of a sales force of 600 reps continuously scrubbing (ACD) practitioner data. While this cooperative approach to sharing practitioner data is a novel approach to the pharmaceutical industry, it provides numerous benefits, including the reduction of costs associated with subscriptions to numerous current information sources, including DEA tables, prescribing data, etc.

The System—"Real Time" Authorization

Figure 5:
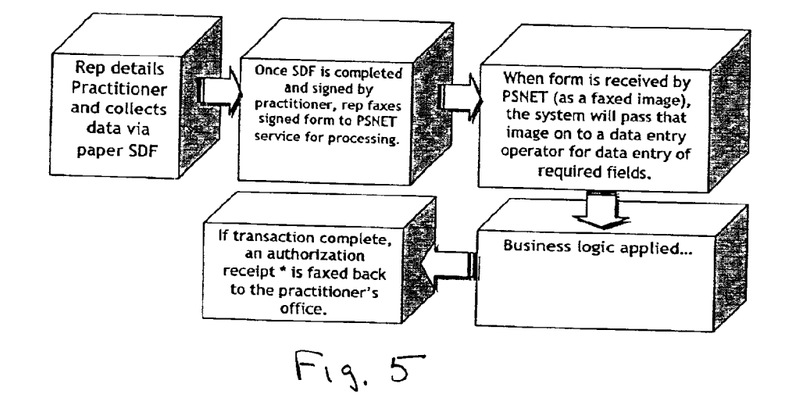
FIG. 5 is a flow chart showing the fax-back facility process.

After a representative has completed the practitioner detailing process and has captured the practitioner's signature on his handheld device the "sample order" is transmitted to The System processor for authorization. It is important to note here that each company has created its own specific business rules regarding sample compliance. These rules, while in conformity with the PDMA guidelines, can have added requirements that each sales call must meet to be considered complete. The System while a distinct process flow (as outlined herein) can adapt to any of the rules as required by the individual client. By creating the general infrastructure that can be applied globally to any potential client the System needs minimal lead-time to add new clients. This process is illustrated in FIG. 5.

Fax-Back/IVR Alternative Options

In some cases data collection cannot be conducted on a hand held device for variety of reasons. For these instances the System process has alternative methods to collect data.

The System Fax Back (SFB)

In the event a representative cannot complete a sample transaction via hand held device, The System provides alternative means of data collection, while adhering to the central tenet of "Real-Time" processing and authorization. Once the representative determines that an alternative means of data collection is necessary, the representative will fill out a paper SDF with all the required information. Each SDF has a unique document identifier (Form ID). These forms are distributed to representatives in a controlled manner, so as to associate a specific Form ID with a representative. It is important to note that it is not possible to scan product bar codes using the hand held device in a paper environment. However, by writing each product's pseudo key information on the SDF, along with the quantities disbursed, will provide the necessary information to complete the transaction.

Figure 6:
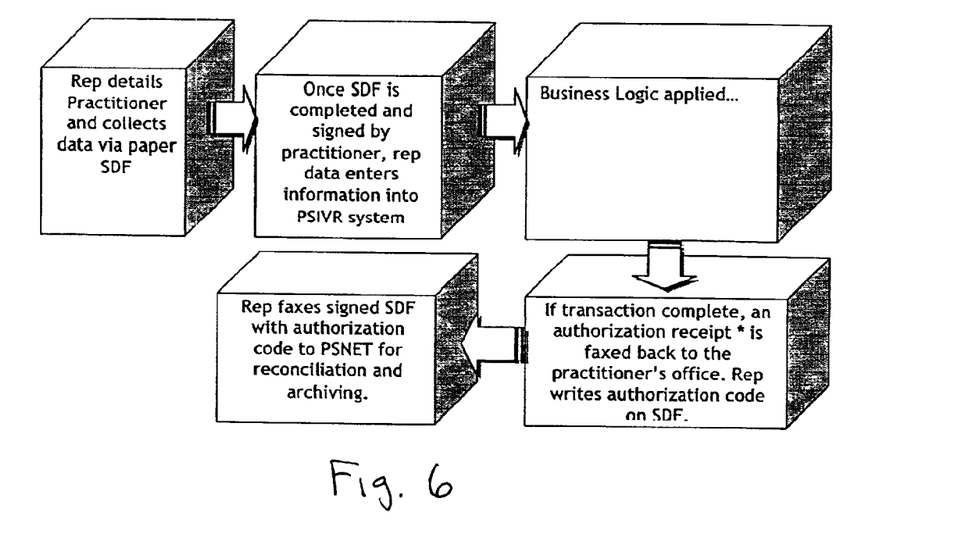
FIG. 6 is a flow chart showing the interactive voice response facility process.

Once the SDF is completed and signed by the Practitioner, the completed form is faxed to the central processor location for processing. The form is received by the central processor via a fax server in an image format. This image is processed by the server and passed to an available data entry clerk. Information from the form is then data entered by the clerk from the image. Business logic is applied, and the transaction is processed. Upon approval, an authorization code is generated, and the representative virtual inventory (VI) is updated to reflect the changes. This authorization code is then merged, along with the original image of the form, onto a receipt to be faxed back to the practitioner's office. Upon receipt of this fax, the representative is authorized to leave samples with the practitioner. The fax back document can be used as the practitioner's receipt. This process is illustrated in FIG. 6.

The System IVR

Figure 7:
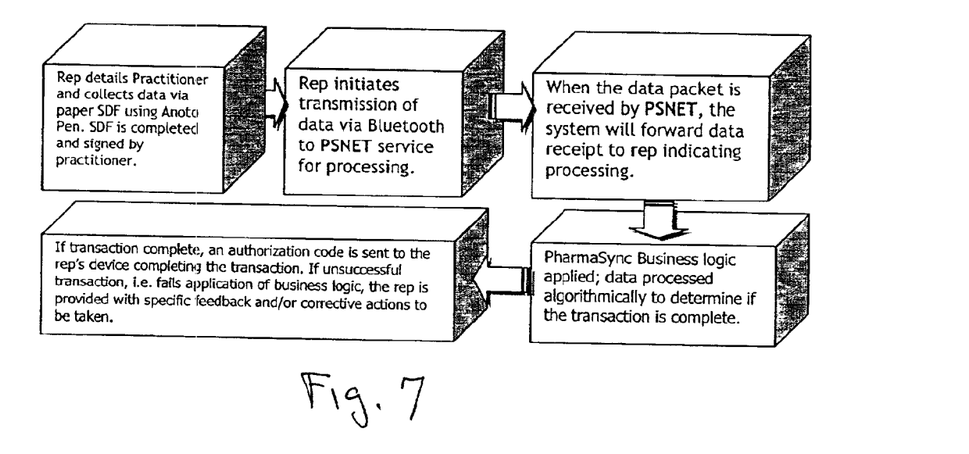
FIG. 7 is a flow chart of the data flow using a handwriting recognition system.

In the event a fax machine is not available to the representative, the transaction may be completed via the System Interactive Voice Response facility (IVR). As outlined above in the fax back process, the data collection process is identical. An SDF is completed with all required information. Once completed and signed by the practitioner, the representative will call the IVR facility and be prompted to data enter all required information using a touch-tone phone. Once this is completed, and the transaction authorized, an authorization code will be generated by the System central processor and provided to the representative. This authorization code will be written onto the original SDF. An additional option is to provide a faxed receipt to the practitioner's office (should a fax machine be available). Once the authorization code is received, the representative may distribute samples to the practitioner. Once this transaction is completed and authorized, the representative mails or faxes the completed, authorized SDF to the PSNET processing center for reconciliation. This must be accomplished within a specified time frame. This process is illustrated in FIG. 7

The System Hardware and Software

The System operates, for example, in two operating platforms—the Palm OS and Microsoft Pocket PC (Windows CE3.0). The data is collected electronically by a portable device, such as an HP Jomada 540 Series Pocket PC equipped with Socket Bar Code Wand Product #SLSL2701-112 and an Ericsson GSM IR Adaptor (connect HP Jomada to the Internet/PSNET with a Ericsson phone Symbol Technologies has combined bar code scanning technology with the Palm® platform to create the SPT 1500. Based on the popular Palm III™, the SPT 1500 enables users to capture and manage data with convenience and functionality. This device can be couple with the Palm III modem for wireless connectivity. Symbol Technologies has another product that incorporates both bar code and wireless ability in a single custom manufactured device.

Recently devices have been developed utilizing "Bluetooth" technology. This new technology is utilized in a device called the Anoto Pen. The Bluetooth wireless technology is a specification, developed by an industry committee, for a small-form factor, low-power, short-range radio links between mobile PCs, mobile phones and other digital devices. The Bluetooth radio enables fast and secure transmission of voice and data, as well as communication compatibility worldwide. Instant connections between devices with built-in Bluetooth wireless technology are maintained even when the devices are not within line of sight.

The Anoto pen consists of three main parts: a digital camera, an advanced image processing unit and a Bluetooth™ radio transceiver. The image processor calculates, in real time, the coordinates that will give an exact position in the entire Anoto pattern. During the image processing, snapshots are compared and information about how the pen is held is also gathered and stored. The angle between the point of the pen and the paper is calculated as well as the turning of the pen. At the upper part of the ink container, a pressure sensor measures the force used at the point of the pen while writing. To all the information gathered above is added an accurate time-stamp. The information collected through each snapshot consists of: X/Y coordinates, angle between pen and paper, turning of the pen, pressure against the paper, and an accurate time-stamp.

Block letters and figures, entered in e.g. pre-defined address fields, are converted to ASCII format. The x/y flat file is compressed and encrypted. All resulting data are packeted and put in an intermediate storage which can accommodate the code for numerous fully written letter pages. Finally, the information is transmitted over a Bluetooth radio link, either directly to a computer where a facsimile of the handwriting on the paper is produced or forwarded via a relay device (e.g. mobile phone, PC or PDA) to the System gateway. From the central processor gateway, the information is processed as outlined above. Note that a minimum of information interpretation is performed in the pen. Data interpretation is performed on the central processor server.

Usage knowledge of handwriting on paper is enough to fill out sample disbursement forms, send e-mail, tax, etc. The pen creates a digital trace of whatever is written or drawn and stores it in the pen until it is forwarded, via a Bluetooth radio link, to the relay device or final destination. FIG. 10 shows examples of the various communication technologies that can be employed.

Figure 8:
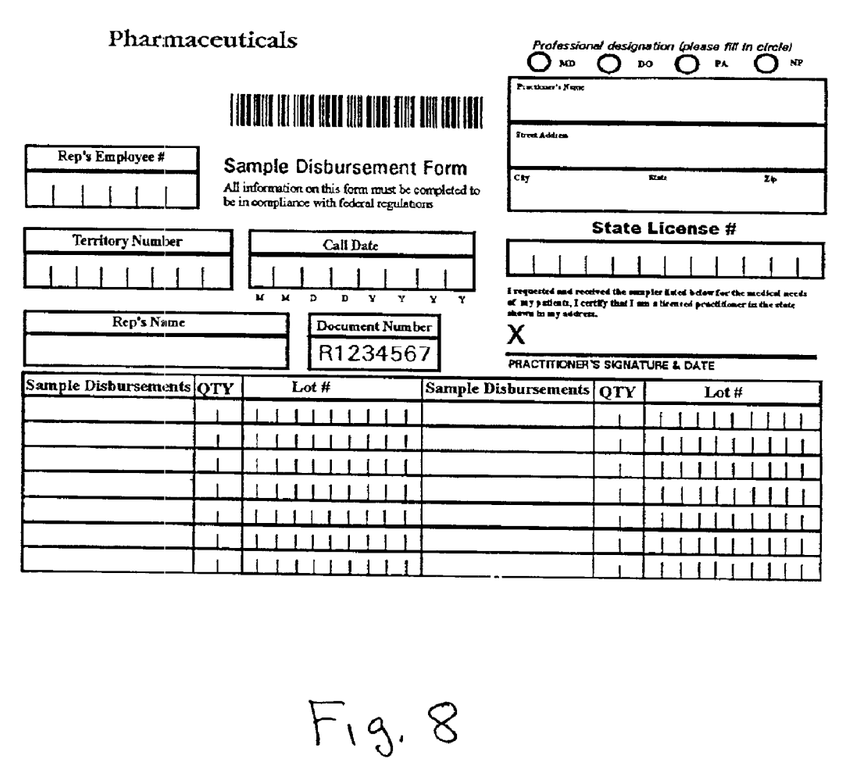
FIG. 8 is an illustration of an exemplary sample disbursement form.
Figure 9:
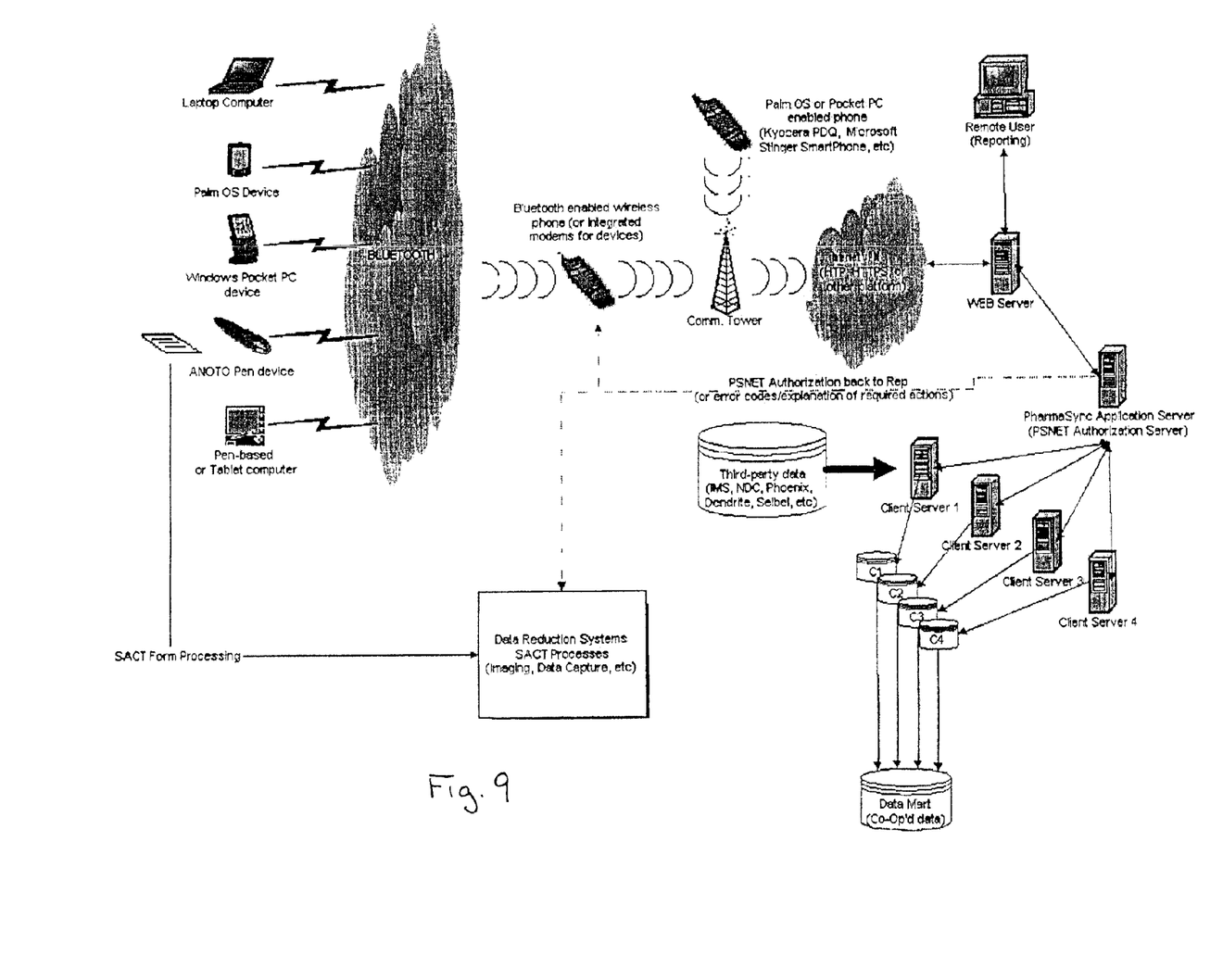
FIG. 9 is a representational illustration of an exemplary System configuration, illustrating exemplary communication technologies.

The System—"Real Time" Authorization Using a Paper Based Solution Utilizing Anoto Technology Applications in this group use the pen and paper mainly as input devices to the computer, PDA or mobile phone. Text written on the SDF is transferred via a Bluetooth radio link as images directly to the computer synchronized to the pen as soon as the 'Store-box' at the bottom of the page is checked. The SDF may also contain other boxes to express certain actions to be taken. One example is to write an address in block letters and then touch the 'Address-box' on the paper with the pen, updating practitioner address information. FIG. 8 illustrates a paper-based solution A similar scenario would be to write the practitioner's sate license number on paper. When the SDF is completed, a mark in the check box will trigger the pen to establish contact with the mobile phone over a central processor Bluetooth radio link. The phone identifies the message as intended for the System server and information is transferred to the base station using GPRS 4 and then by means of TCP/IP onward to the central processor server where the SDF is decoded. The data is processed as previously noted. A confirmation of delivery is sent from central processor to the representative's device with subsequent authorization shown on the mobile phone display after processing. In the event the transaction can't be authorized this information will be transmitted back to the representative's device along with error code(s) identifying reject reason(s). Block letters in dedicated fields are converted to ASCII format by the pen. The representative initiates transmission of data via Bluetooth to the System central processor for processing. When the data packet is received by the central processor, the System will forward a data receipt to the representative indicating processing.

By utilizing the System process, pharmaceutical companies can, in real time, account for their entire product inventory. This applies to inventory in the warehouse, at the representative's location as well as at the practitioner's office. Not only can this process assist pharmaceutical companies minimize diversion, it can lower their inventory costs by tracking all usage. Another facet of the System will be the ability to recall product from anywhere by specified product information, since all of that information will now be tracked automatically and in "real time". All transactions will no longer be considered rep-centric; dependant upon data to be provided by the representative after a transaction has been completed.

What is claimed is:

1. A method for tracking and controlling the distribution of controlled articles from a central inventory of a pharmaceutical company, a portion of the central inventory having been conveyed to at least one remote distributing representative of the pharmaceutical company for further distribution to distributees, the tracking and controlling being conducted in real time by means of electronic communication and data collection, comprising:
   a) preauthorizing a specific distribution transaction to be conducted by the distributing representative by sending a distribution request from the distributing representative for distribution of a packet of articles to a distributee, to a system server and receiving the distribution request in the system server, the request comprising a representative identifier, a distributee identifier, and a statement describing the contents of the packet of articles being distributed from the portion of the central inventory conveyed to the distributing representative;
   b) confirming the authority of the distributing representative to distribute the packet;
   c) confirming the authority of the distributee to receive the packet;
   d) evaluating the distribution request for meeting specific business logic specified by the pharmaceutical company;
   e) upon successful completion of the preceding steps, transmitting an authorization code to the distributing representative indicating to the distributing representative an authorization to conduct the specific distribution transaction, the authorization code serving as recordable proof of authorization to conduct the specific distribution transaction;
   f) maintaining a local inventory corresponding to the portion of central inventory remaining in the distributing representative possession by decrementing the packet's contents from the local inventory and decrementing the packet's contents from the central inventory; and
   g) distributing the packet to the distributee.

2. A method of claim 1 in which the controlled articles are prescription drug samples.

3. A method of claim 2 in which the distributees are licensed dispensing practitioners.

4. A method of claim 1 in which the request is received from the remote distributing representative over a communication path including a wireless link.

5. A method of claim 1 including the step of transmitting the request and the authorization code to the pharmaceutical company.

6. A method of claim 1 including transmitting a corrective action message to the distributing representative if the evaluation step results in an initial denial of authorization.

7. A method of claim 1 in which the request is received from the remote distributing representative by means of electronic transmission of information entered on a sample disbursement form.

8. The method of claim 7, wherein the means of electronic transmission is a fax.

9. The method of claim 7, wherein the means of electronic transmission includes a telephone system with an interactive voice response facility.

10. A method of claim 1 in which the specific business logic includes meeting requirements for distribution specified by governmental regulations.

11. The method of claim 1, further comprising the steps of the pharmaceutical company delivering a packet of articles to a remote distributing representative, the distributing representative checking the content of the packet of articles after receiving the packet and issuing an acknowledgement of delivery (AOD) for the articles received, all before said steps of sending and receiving a distribution request in a system server.

12. The method of claim 11, wherein said step of checking is conducted by the representative scanning a bar code associated with the content of the packet of articles, the bar code identifying the content and quantity, the identification and quantity data being stored in a computer and transmitted to the pharmaceutical company as part of the acknowledgement of delivery (AOD).

13. The method of claim 1, wherein data for making the statement describing the contents of the packet of articles is obtained by the representative by scanning a bar code associated with the contents of the packet of articles.

14. The method of claim 1, wherein the distributee identifier includes a digital signature of the distributee along with a time/date stamp associated therewith.

15. The method of claim 1, wherein the representative identifier includes the digital signature of the distributing representative.

16. The method of claim 15, wherein the digital signature of the distributing representative is accompanied by a time/date stamp.

17. The method of claim 1, wherein the authorization code is stored by the distributing representative as proof of authorization to distribute the packet associated therewith.

18. The method of claim 1, as applied to a plurality of representatives, the local inventories of each of which are auditable at any time by virtue of the prior execution of steps (a) through (g).

* * * * *